(12) United States Patent
Fukami

(10) Patent No.: US 10,970,022 B2
(45) Date of Patent: Apr. 6, 2021

(54) INFORMATION PROCESSING APPARATUS WITH PRINT JOB GROUPING FUNCTION AND NON-TRANSITORY COMPUTER READABLE MEDIUM

(71) Applicant: FUJI XEROX CO., LTD., Tokyo (JP)

(72) Inventor: Dai Fukami, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 16/550,278

(22) Filed: Aug. 25, 2019

(65) Prior Publication Data

US 2020/0310725 A1    Oct. 1, 2020

(30) Foreign Application Priority Data

Mar. 25, 2019  (JP) .............................. JP2019-056027

(51) Int. Cl.
  *G06F 3/12*    (2006.01)
(52) U.S. Cl.
  CPC .......... *G06F 3/1262* (2013.01); *G06F 3/1204* (2013.01); *G06F 3/1205* (2013.01); *G06F 3/1263* (2013.01)

(58) Field of Classification Search
  CPC .... G06F 3/1262; G06F 3/1205; G06F 3/1204; G06F 3/1263
  USPC ........................................................ 358/1.15
  See application file for complete search history.

(56) References Cited

U.S. PATENT DOCUMENTS

| 10,338,862 | B2 | 7/2019 | Inoda |
| 2006/0139690 | A1 | 6/2006 | Yagita |
| 2012/0176645 | A1* | 7/2012 | Saito ..................... G06F 3/1204 358/1.15 |

FOREIGN PATENT DOCUMENTS

| JP | 2006-004077 | 1/2006 |
| JP | 2018-151810 | 9/2018 |

* cited by examiner

*Primary Examiner* — Kent Yip
(74) *Attorney, Agent, or Firm* — JCIPRNET

(57) ABSTRACT

An information processing apparatus includes: an assignment unit that assigns plural associated execution instructions to a first group and a second group; and an order setting unit that sets an order of second execution instructions assigned to the second group in accordance with an order of first execution instructions assigned to the first group.

6 Claims, 4 Drawing Sheets

INFORMATION PROCESSING APPARATUS WITH PRINT JOB GROUPING FUNCTION AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-056027 filed Mar. 25, 2019.

BACKGROUND

(i) Technical Field

The present disclosure relates to an information processing apparatus and a non-transitory computer readable medium.

(ii) Related Art

In recent years, there has been proposed an information processing apparatus that implements a print job grouping function with a simple configuration even in an environment in which no print server is provided or in a print system environment in which a job grouping function is not implemented by a printer driver or a printer device (see Japanese Unexamined Patent Application Publication No. 2006-004077, for example).

The information processing apparatus described in Japanese Unexamined Patent Application Publication No. 2006-004077 includes a unit that receives a plurality of print jobs based on application data, a unit that groups the plurality of print jobs received by the receiving unit to manage such print jobs as a group job, and a unit that performs control so as to transfer the plurality of print jobs to an image forming apparatus in one session using a predetermined print protocol after the plurality of print jobs are completely spooled.

SUMMARY

Aspects of non-limiting embodiments of the present disclosure relate to providing an information processing apparatus and a non-transitory computer readable medium that enable, in the case where a plurality of associated execution instructions are assigned to different devices to be executed thereby, changing the arrangement of execution instructions for one device in accordance with the arrangement of execution instructions for another device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: an assignment unit that assigns a plurality of associated execution instructions to a first group and a second group; and an order setting unit that sets an order of second execution instructions assigned to the second group in accordance with an order of first execution instructions assigned to the first group.

BRIEF DESCRIPTION OF THE DRAWINGS

An exemplary embodiment of the present disclosure will be described in detail based on the following figures, wherein.

DETAILED DESCRIPTION

Figure 1:
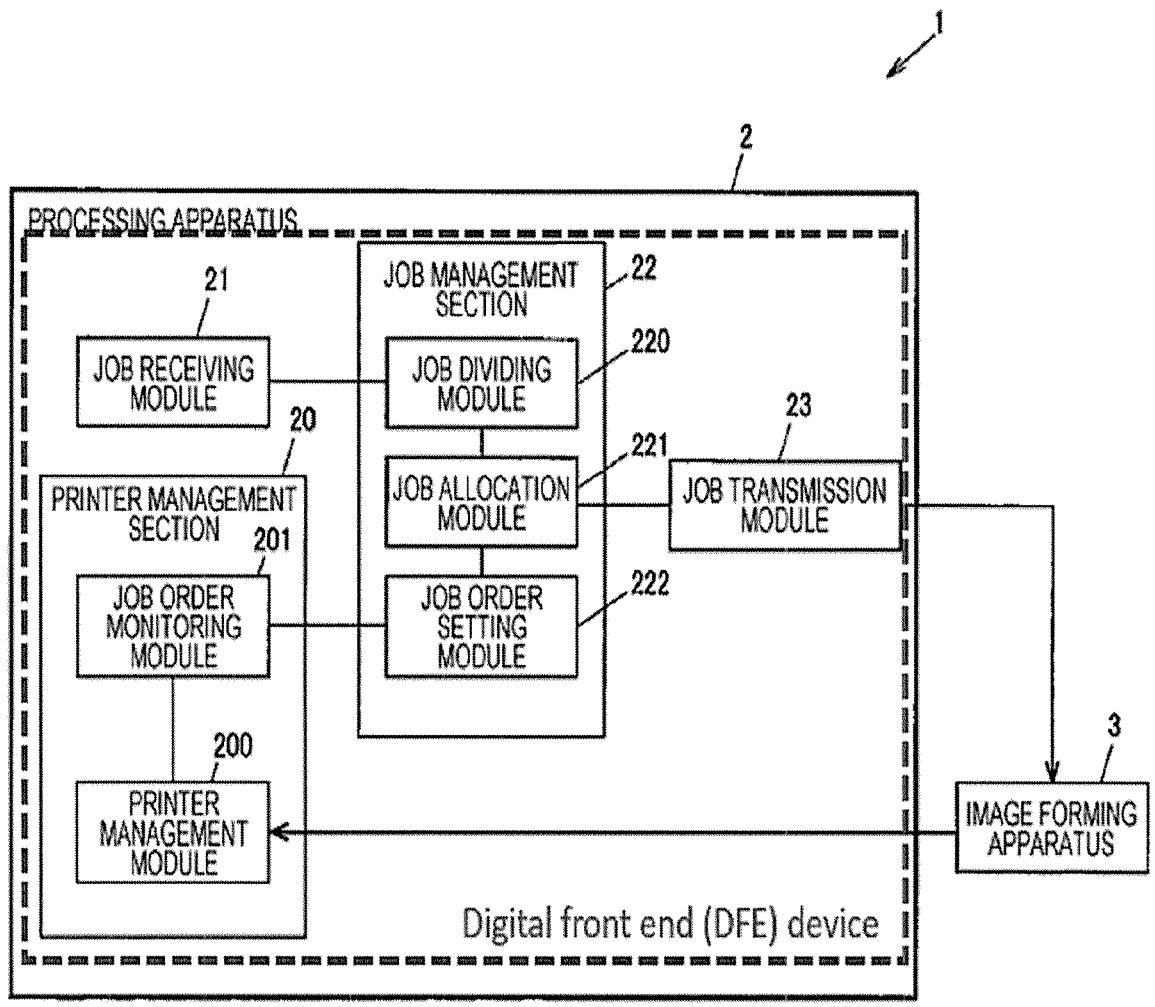
FIG. 1 is a block diagram illustrating an example of a control system of an information processing system according to the present exemplary embodiment.

An exemplary embodiment of the present disclosure will be described below with reference to the drawings. In the drawings, constituent elements that have substantially the same function are denoted by the same reference numeral to omit redundant description.

Exemplary Embodiment

FIG. 1 is a block diagram illustrating an example of a control system of an information processing system according to an exemplary embodiment of the present disclosure. An information processing system 1 is composed of an information processing apparatus (hereinafter also referred to simply as a "processing apparatus") 2 and an image forming apparatus 3 connected to the processing apparatus 2 via a network (not illustrated) etc.

Figure 2:
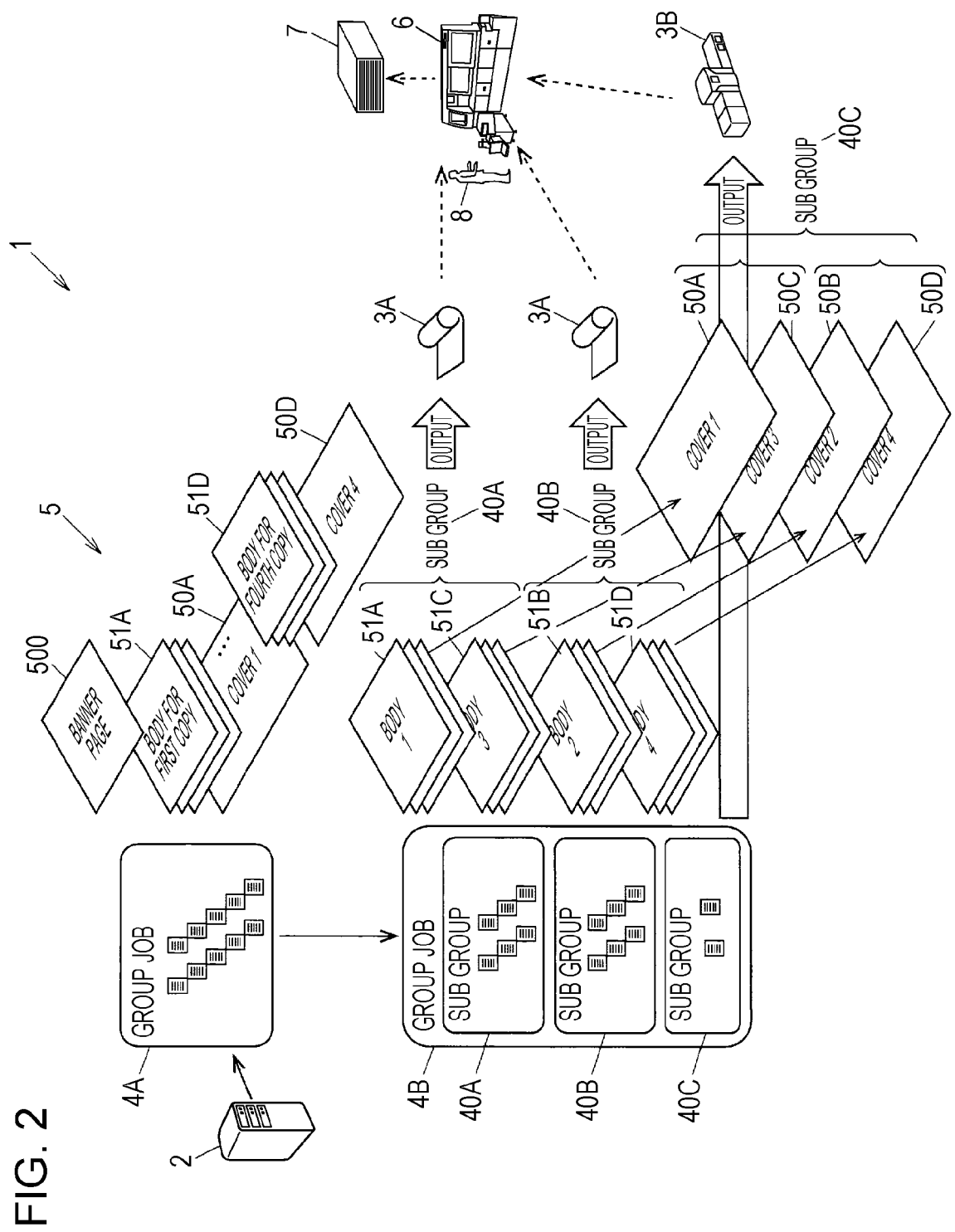
FIG. 2 is a block diagram illustrating an example in which jobs are rearranged in the transmission order.

Examples of the image forming apparatus 3 include a continuous feed printer 3A (see FIG. 2) and a cut paper printer 3B (see FIG. 2). The image forming apparatus 3 is an example of a device. The information processing system 1 may further include a book binding machine 6 (see FIG. 2) that binds printed matter output from the image forming apparatus 3.

(Configuration of Processing Apparatus 2)

The processing apparatus 2 is a server device such as a digital front end (DEF) device, for example. The processing apparatus 2 includes a printer management section 20, a job receiving module 21, a job management section 22, and a job transmission module 23. The term "module" refers to a unit that executes a particular function and that includes software and hardware that is logically separable.

The printer management section 20 includes a printer management module 200 that manages the image forming apparatus 3 which is connected to the processing apparatus 2, and a job order monitoring module 201 that monitors the order of print instructions (hereinafter also referred to as "jobs" or "print jobs") for execution of printing.

The printer management module 200 manages various types of information such as the remaining amount of consumables (such as rolled paper, for example, in the case where the image forming apparatus 3 is a continuous feed printer 3A) for the image forming apparatus 3 which is connected to the processing apparatus 2 and the status of the image forming apparatus 3, for example.

The printer management module 200 extracts and designates the image forming apparatus 3 which is able to execute a job in accordance with the remaining amount of consumables. For example, the printer management module 200 selects and designates, from among a plurality of continuous feed printers 3A and cut paper printers 3B connected to the processing apparatus 2, a particular continuous feed printer 3A that has a remaining amount of rolled paper that enables execution and output of a group job to be discussed later.

The job order monitoring module 201 monitors the order of jobs transmitted to the image forming apparatus 3. Examples of the "order of jobs" include the order in which the jobs are transmitted to the image forming apparatus 3 by the processing apparatus 2, the order in which the jobs are executed by the image forming apparatus 3, etc.

In the case where jobs are executed in a different order from the order in which the jobs are transmitted to the image forming apparatus 3 for some reason, the job order monitoring module 201 acquires information (hereinafter also referred to as a "job order change") indicating that the order of the jobs has been changed and transmitted from the image forming apparatus 3. The job order monitoring module 201 checks, in accordance with the acquired information, whether or not the order in which the jobs are transmitted and the order in which the jobs are executed are the same as each other.

The job receiving module 21 receives a print job. Examples of the print job include those transmitted from an external device such as a terminal device used by an operator (hereinafter also referred to as a "user"), those generated in accordance with an operation by the user on the image forming apparatus 3, etc. The job receiving module 21 determines whether or not the received job constitutes a particular group job (to be discussed later), that is, whether or not the received job is a group job.

The job management section 22 includes a job dividing module 220 that divides jobs, a job allocation module 221 that allocates the jobs, and a job order setting module 222 that sets the order of the jobs. The job dividing module 220 and the job allocation module 221 are an example of an assignment unit. The job order setting module 222 is an example of an order setting unit.

The job dividing module 220 divides a group of jobs (hereinafter also referred to as a "group job") that include a plurality of associated jobs into two or more partial groups (hereinafter also referred to as "sub groups"). The term "associated" refers to a state in which a plurality of jobs that have a common attribute may be handled collectively.

For example, the job dividing module 220 divides a group job into two sub groups, namely a sub group composed of jobs that instruct the continuous feed printer 3A to execute printing and a sub group composed of jobs that instruct the cut paper printer 3B to execute printing.

The job allocation module 221 allocates the jobs to the image forming apparatus 3 which is designated by the printer management module 200. Specifically, the job allocation module 221 allocates the corresponding jobs to the two or more sub groups which are separated by the job dividing module 220. More specifically, the job allocation module 221 allocates the jobs in accordance with the attribute (such as the remaining amount of rolled paper of the continuous feed printer 3A, for example) of the image forming apparatus 3 and the attribute of printed matter such as the size of the printed matter, for example.

The job order setting module 222 sets the order of a plurality of jobs allocated to one sub group by the job allocation module 221. Specifically, the job order setting module 222 changes the order of a plurality of jobs, that is, rearranges a plurality of jobs, in any of a plurality of sub groups such that the orders of the plurality of allocated jobs correspond to each other. The term "order" refers to the order of transmission to the image forming apparatus 3, that is, the order in which the image forming apparatus 3 is instructed to execute printing.

Preferably, the job order setting module 222 rearranges a plurality of jobs in a sub group, among a plurality of sub groups, for which the number of copies to be printed is smaller.

The job transmission module 23 transmits the jobs to the image forming apparatus 3. Specifically, the job transmission module 23 transmits the jobs to the image forming apparatus 3 in the order set by the job order setting module 222 for each of the sub groups separated by the job dividing module 220.

Detailed Operation According to Exemplary Embodiment

Next, operation of the information processing system 1 will be described in detail with reference to two examples. The two examples differ from each other in the criterion on the basis of which the jobs are to be rearranged.

(Example 1) An example in which the jobs are rearranged in accordance with the order (hereinafter also referred to as an "order of transmission" or simply as a "transmission order") in which the jobs are transmitted to the image forming apparatus 3, and (Example 2) An example in which the jobs are rearranged in accordance with the order (hereinafter also referred to simply as an "output order" or an "output result order") in which the jobs are output from the image forming apparatus 3.

The two examples are examples of the rearrangement of the jobs, and the present disclosure is not limited thereto.

(1) First Example

FIG. 2 is a block diagram illustrating an example in which the jobs are rearranged in the transmission order. The following describes, by way of example, a group job 4A composed of a plurality of jobs for execution of printing of printed matter 5 that includes N (N is a natural number) covers 50A to 50D, N texts (hereinafter also referred to as "bodies") 51A to 51D, and one instruction (hereinafter also referred to as a "banner page"). For convenience of description, N is 4. However, N may be 1 to 3, or may be 5 or more. The plurality of jobs are an example of a plurality of execution instructions.

[Operation of Processing Apparatus 2]

The job dividing module 220 divides the group job 4A into several sub groups. The job dividing module 220 divides the group job 4A into three sub groups 40A, 40B, and 40C.

The three sub groups 40A, 40B, and 40C include a first sub group 40A that instructs a first continuous feed printer 3A to execute printing, a second sub group 40B that instructs a second continuous feed printer 3A to execute printing, and a third sub group 40C that instructs the cut paper printer 3B to execute printing. The first sub group 40A and the second sub group 40B are an example of a first group. The third sub group 40C is an example of a second group.

The collection of sub groups after the division, which includes the first sub group 40A, the second sub group 40B, and the third sub group 40C, is also referred to as a "group job 4B" in distinction from the group job 4A before the division. In the following description, in the case where it is not necessary to distinguish the first continuous feed printer 3A and the second continuous feed printer 3A from each other, the first and second continuous feed printers 3A will be collectively referred to simply as "continuous feed printers 3A".

The job allocation module 221 allocates the jobs to the first sub group 40A, the second sub group 40B, and the third sub group 40C. In the example illustrated in FIG. 2, the job allocation module 221 allocates two jobs related to the body 51A for a first copy and the body 51C for a third copy to the first sub group 40A, allocates two jobs related to the body 51B for a second copy and the body 51D for a fourth copy to the second sub group 40B, and allocates four jobs related to the covers 50A to 50D to the third sub group 40C. The jobs related to the bodies 51A to 51D are an example of a first execution instruction. The jobs related to the covers 50A to 50D are an example of a second execution instruction.

The job order setting module 222 rearranges the jobs such that the order of the jobs allocated to the continuous feed printers 3A and the order of the jobs allocated to the cut paper printer 3B correspond to each other.

Specifically, the job order setting module 222 rearranges the jobs such that the order of the jobs allocated to the continuous feed printers 3A, that is, the body 51A for the first copy, the body 51C for the third copy, the body 51B for the second copy, and the body 51D for the fourth copy allocated to the first sub group 40A and the second sub group 40B, and the order of the four jobs related to the covers 50A to 50B and allocated to the cut paper printer 3B correspond to each other.

More specifically, the job order setting module 222 rearranges the jobs (see the oblique arrows in FIG. 2) such that the four jobs related to the covers 50A to 50B and allocated to the cut paper printer 3B are in the order of "cover 1", "cover 3", "cover 2", and "cover 4" so as to correspond to the order of the body 51A for the first copy, the body 51C for the third copy, the body 51B for the second copy, and the body 51D for the fourth copy allocated to the continuous feed printers 3A.

Next, the job transmission module 23 transmits the jobs to the corresponding image forming apparatuses 3 in the order of the jobs discussed above. Specifically, the job transmission module 23 transmits the job related to the body 51A for the first copy and the job related to the body 51C for the third copy, which belong to the first sub group 40A, in this order to the first continuous feed printer 3A, transmits the job related to the body 51B for the second copy and the job related to the body 51D for the fourth copy, which belong to the second sub group 40B, in this order to the second continuous feed printer 3A, and transmits the four jobs related to the covers 50A to 50D, which belong to the third sub group 40C, in the order changed by the job order setting module 222 (i.e. in the order of "cover 1", "cover 3", "cover 2", and "cover 4") to the cut paper printer 3B.

[Operation of Image Forming Apparatus 3]

The image forming apparatus 3 receives the jobs which are transmitted from the job transmission module 23 of the processing apparatus 2. Specifically, the first continuous feed printer 3A receives the jobs which belong to the first sub group 40A. The second continuous feed printer 3A receives the jobs which belong to the second sub group 40B. The cut paper printer 3B receives the jobs which belong to the third sub group 40C.

The image forming apparatus 3 executes printing in accordance with the received jobs (see the block arrows with a text "output" in FIG. 2). Specifically, the first continuous feed printer 3A executes printing of the body 51A for the first copy and the body 51C for the third copy in this order in accordance with the job related to the body 51A for the first copy and the job related to the body 51C for the third copy.

The second continuous feed printer 3A executes printing of the body 51B for the second copy and the body 51D for the fourth copy in this order in accordance with the job related to the body 51B for the second copy and the job related to the body 51D for the fourth copy. The cut paper printer 3B executes printing in the order of "cover 1", "cover 3", "cover 2", and "cover 4" in accordance with the order of the four jobs related to the covers 50A to 50D.

[Operation of Book Binding Machine 6]

The printed matter 5 which is output from the image forming apparatus 3 is carried to the book binding machine 6 by a worker 8 (see the broken allows in FIG. 2). The book binding machine 6 binds the collected printed matter 5 into booklets 7.

(2) Second Example

Figure 3:
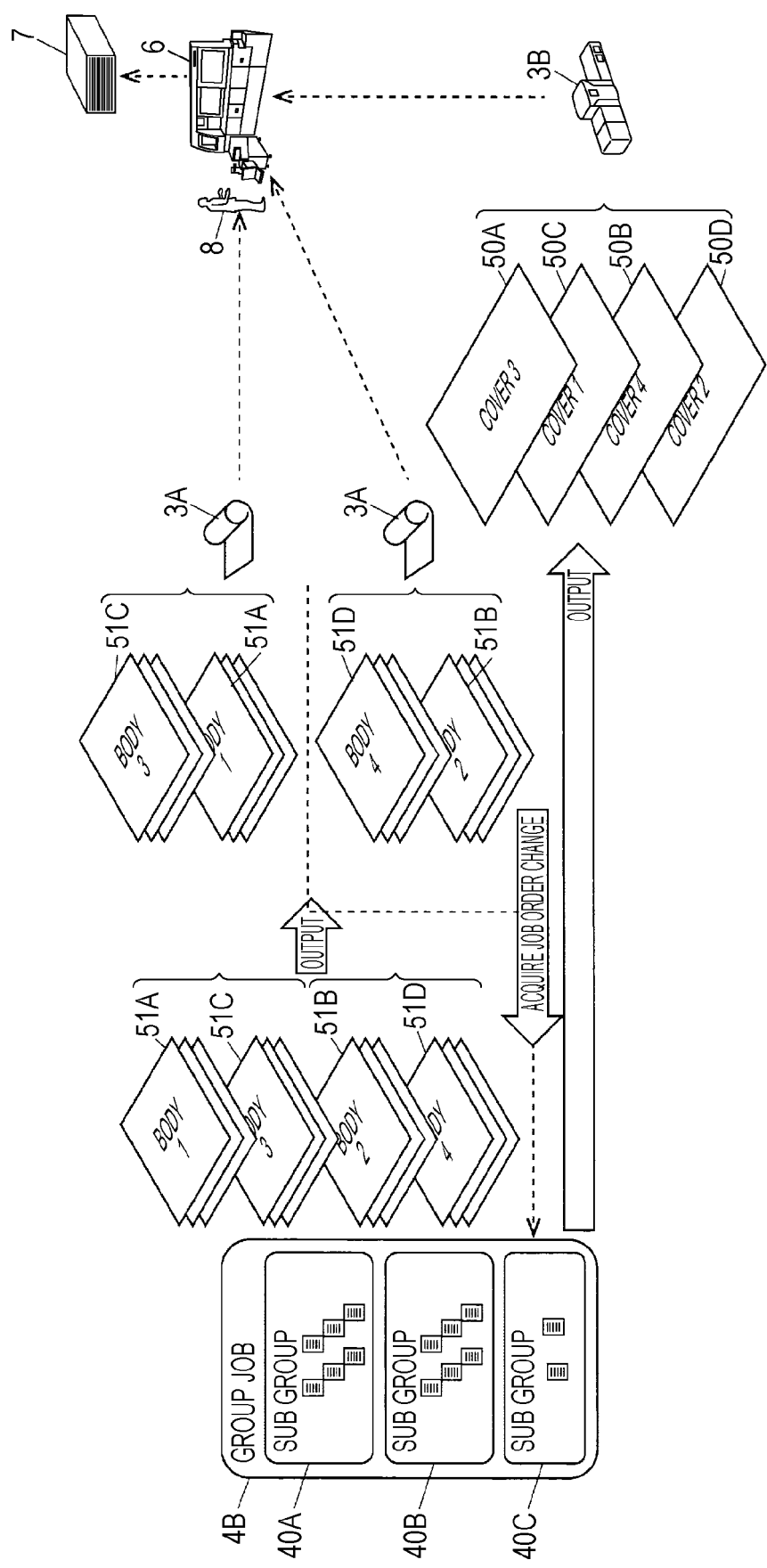
FIG. 3 is a block diagram illustrating an example in which jobs are rearranged in the output order.

FIG. 3 is a block diagram illustrating an example in which the jobs are rearranged in the output order. Contents that overlap those described in relation to FIG. 2 will not be described in detail, and differences from FIG. 2 will be principally described. In FIG. 3, the group job 4A before the division is not illustrated.

In the case where the order of output from the continuous feed printer 3A has been changed for some reason, that is, in the case where printing is executed in a different order from the order in which the jobs are transmitted to the continuous feed printer 3A, the continuous feed printer 3A sends information that indicates the job order change to the processing apparatus 2 (see the leftward block arrow in FIG. 3). FIG. 3 illustrates, as an example of a case where the order of output from the continuous feed printer 3A is changed, a case where the jobs are transmitted in the order of the body 51A for the first copy, the body 51C for the third copy, the body 51B for the second copy, and the body 51D for the fourth copy and the printed matter 5 is output in the order of the body 51C for the third copy, the body 51A for the first copy, the body 51D for the fourth copy, and the body 51B for the second copy.

The job order monitoring module 201 acquires the information that indicates the job order change from the continuous feed printer 3A. When the job order monitoring module 201 acquires the information that indicates the job order change, the job order setting module 222 rearranges the jobs in the third sub group 40C so as to correspond to the output order.

Specifically, as illustrated in FIG. 3, the job order setting module 222 rearranges the four jobs related to the covers 50A to 50D, which belong to the third sub group 40C, so as to correspond to the output order discussed above, that is, in the order of "cover 3", "cover 1", "cover 4", and "cover 2".

Summary of Operation According to Exemplary Embodiment

Figure 4:
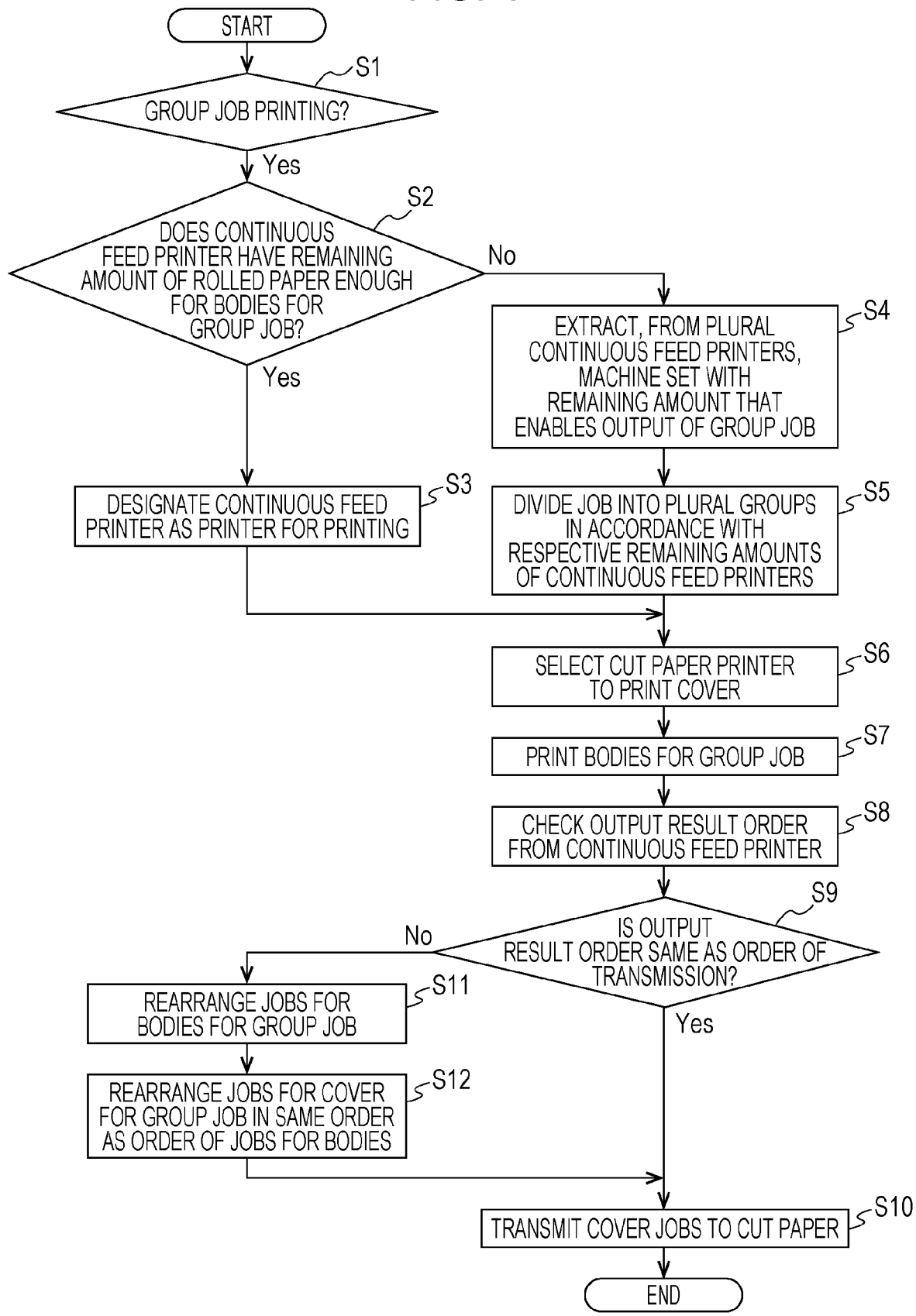
FIG. 4 is a flowchart illustrating an example of operation of the information processing system according to the present exemplary embodiment.

Next, operation of the information processing system 1 discussed above will be summarized in a flowchart. FIG. 4 is a flowchart illustrating an example of operation of the information processing system 1 according to the exemplary embodiment of the present disclosure. The job receiving module 21 receives a job.

Next, the job receiving module 21 determines whether or not the received job is a job (hereinafter also referred to simply as "group job printing") for printing related to a group job (S1). In the case where the job is group job printing (S1: Yes), the printer management module 200 checks whether the continuous feed printer 3A has a remaining amount of rolled paper enough for the bodies for the group job (S2).

In the case where the continuous feed printer 3A has a remaining amount of rolled paper for the bodies for the group job (S2: Yes), the printer management module 200 designates the continuous feed printer 3A as the printer for printing (S3).

In the case where the continuous feed printer 3A does not have a remaining amount of rolled paper enough for the bodies for the group job (S2: No), the printer management module 200 extracts, from a plurality of continuous feed printers 3A, a machine set with a remaining amount that enables output of the group job (S4).

Next, the job management section 22 divides the job into a plurality of groups in accordance with the respective remaining amounts of the continuous feed printers 3A (S5). Specifically, the job dividing module 220 divides the group job into several sub groups, and the job allocation module 221 allocates the jobs to the sub groups in accordance with the respective remaining amounts of the continuous feed printers 3A.

Next, the printer management module 200 selects the cut paper printer 3B to print the cover 50 (S6). The job transmission module 23 transmits the corresponding jobs to the continuous feed printer 3A. The continuous feed printer 3A receives the jobs which are transmitted from the processing apparatus 2.

The continuous feed printer 3A prints the bodies for the group job in accordance with the received jobs (S7). The job order monitoring module 201 acquires the output result order from the continuous feed printer 3A, and checks whether or not the output result order is the same as the order of transmission (S8).

In the case where the output result order is the same as the order of transmission (S9: Yes), the job transmission module 23 transmits jobs (hereinafter also referred to simply as "cover jobs") related to the cover to the cut paper printer 3B (hereinafter also referred to simply as "cut paper") (S10).

In the case where the output result order is not the same as the order of transmission (S9: No), the job order setting module 222 rearranges the jobs for the bodies for the group job in the order of output from the printer (S11). The job order setting module 222 rearranges the jobs for the cover for the group job in the same order as the order of the jobs for the bodies (S12).

The job transmission module 23 transmits the cover jobs after the rearrangement to the cut paper (S10). Operation in step S10, among the steps described above, may be performed between operation in step S6 and operation in step S7, for example.

While an exemplary embodiment of the present disclosure has been described above, exemplary embodiments of the present disclosure are not limited to the exemplary embodiment described above, and a variety of modifications and implementations may be made without departing from the scope and spirit of the present disclosure. For example, the order of the jobs in the third sub group 40C, which instruct the cut paper printer 3B to perform printing, is changed in the exemplary embodiment discussed above. However, the order of the plurality of jobs in the first sub group 40A or the second sub group 40B, which instruct the continuous feed printer 3A to perform printing, may be changed in correspondence with the order of the plurality of jobs in the third sub group 40C.

Even in the case where the jobs are transmitted to the continuous feed printer 3A and the cut paper printer 3B at the same time in Example 1 discussed above, control may be performed such that the cut paper printer 3B temporarily stops execution of the jobs and, after the continuous feed printer 3A completes execution of printing, resumes printing with the jobs for the cut paper printer 3B rearranged in accordance with the order of output from the continuous feed printer 3A.

In the case where the jobs are transmitted to the continuous feed printer 3A and the cut paper printer 3B at the same time as in Example 1, a restriction may be imposed such that the order of printing by the continuous feed printer 3A is not changeable after the cut paper printer 3B starts printing. Alternatively, in such a situation, a warning indicating that the order is to be changed may be displayed in the case where the order of printing by the continuous feed printer 3A is to be changed.

The present disclosure is not necessarily limited to an aspect in which a group job is divided into sub groups, and may be applied to a method of assigning a plurality of associated jobs to two groups, for example.

Some of the constituent elements of the exemplary embodiment described above may be omitted or changed without departing from the scope and spirit of the present disclosure. Additions, deletions, changes, interchanges, etc. may be made to the steps of the flow according to the exemplary embodiment described above without departing from the scope and spirit of the present disclosure. The program used in the exemplary embodiment described above may be provided as recorded in a computer-readable recording medium such as a CD-ROM, or may be stored in an external server such as a cloud server to be used via a network.

What is claimed is:

1. An information processing apparatus comprising:
a hardware processor, configured
to assign a plurality of associated execution instructions to a first group and a second group, wherein the associated execution instructions are print jobs for printing printed matters that comprises a first printed matter and a second printed matter,
wherein the first group comprises print jobs to print a first part of the first printed matter and to print a first part of the second printed matter, and the second group comprises print jobs to print a second part of the first printed matter and to print a second part of the second printed matter;
in response to an order of the print jobs assigned to the first group being set, to set the print jobs assigned to the second group in an order that is same as an order of the first part of the first printed matters and the first part of the second printed matter; and
to transmit the second group to a printer,
wherein a number of copies to be printed in accordance with the print jobs assigned to the second group is smaller than a number of copies to be printed in accordance with the print jobs assigned to the first group.

2. The information processing apparatus according to claim 1,
wherein the hardware processor is configured to rearrange the print jobs assigned to the second group in correspondence with an order in which print jobs assigned to the first group are executed by a device connected to the information processing apparatus.

3. The information processing apparatus according to claim 2,
wherein the hardware processor is configured to rearrange the print jobs assigned to the second group after the device finishes printing.

4. The information processing apparatus according to claim 1, wherein the hardware processor is further configured to rearrange the print jobs assigned to the second group in correspondence with an order in which the print jobs assigned to the first group are transmitted to a first printer.

5. A non-transitory computer readable medium storing a program causing a computer to execute a process, the process comprising:
  assigning a plurality of associated execution instructions to a first group and a second group, wherein the associated execution instructions are print jobs for printing printed matters that comprises a first printed matter and a second printed matter,
  wherein the first group comprises print jobs to print a first part of the first printed matter and to print a first part of the second printed matter, and the second group comprises print jobs to print a second part of the first printed matter and to print a second part of the second printed matter;
  in response to an order of the print jobs assigned to the first group being set, setting print jobs assigned to the second group in an order that is same as an order of the first part of the first printed matters and the first part of the second printed matter; and
  transmitting the second group to a printer;
  wherein a number of copies to be printed in accordance with the print jobs assigned to the second group is smaller than a number of copies to be printed in accordance with the print jobs assigned to the first group.

6. An information processing method comprising:
  assigning a plurality of associated execution instructions to a first group and a second group, wherein the associated execution instructions are print jobs for printing printed matters that comprises a first printed matter and a second printed matter,
  wherein the first group comprises print jobs to print a first part of the first printed matter and to print a first part of the second printed matter, and the second group comprises print jobs to print a second part of the first printed matter and to print a second part of the second printed matter;
  in response to an order of the print jobs assigned to the first group being set, setting print jobs assigned to the second group in an order that is same as an order of the first part of the first printed matters and the first part of the second printed matter; and
  transmitting the second group to a printer;
  wherein a number of copies to be printed in accordance with the print jobs assigned to the second group is smaller than a number of copies to be printed in accordance with the print jobs assigned to the first group.

* * * * *